July 17, 1962

J. J. HILL 3,044,598

SELECTIVE VENDING MACHINE

Filed April 15, 1959

INVENTOR.
JAMES J. HILL
BY

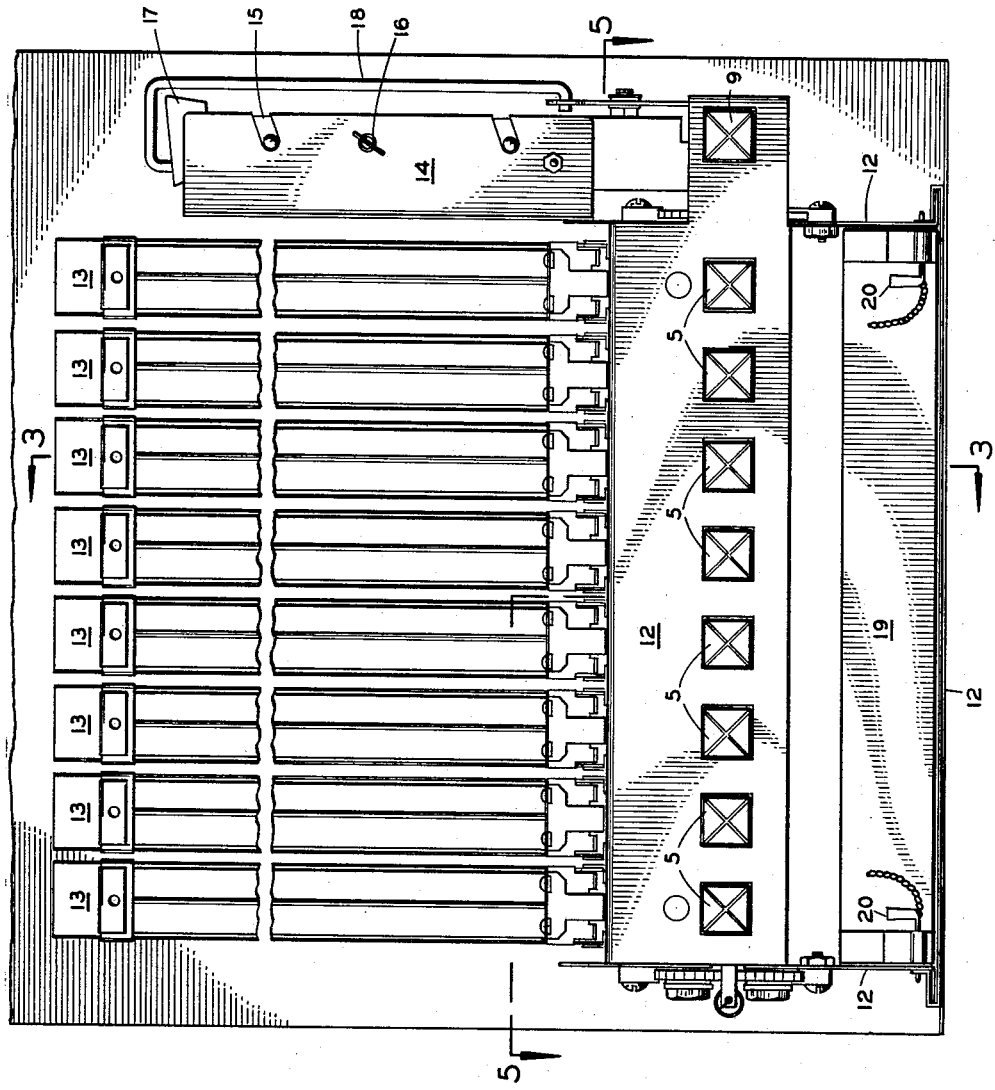

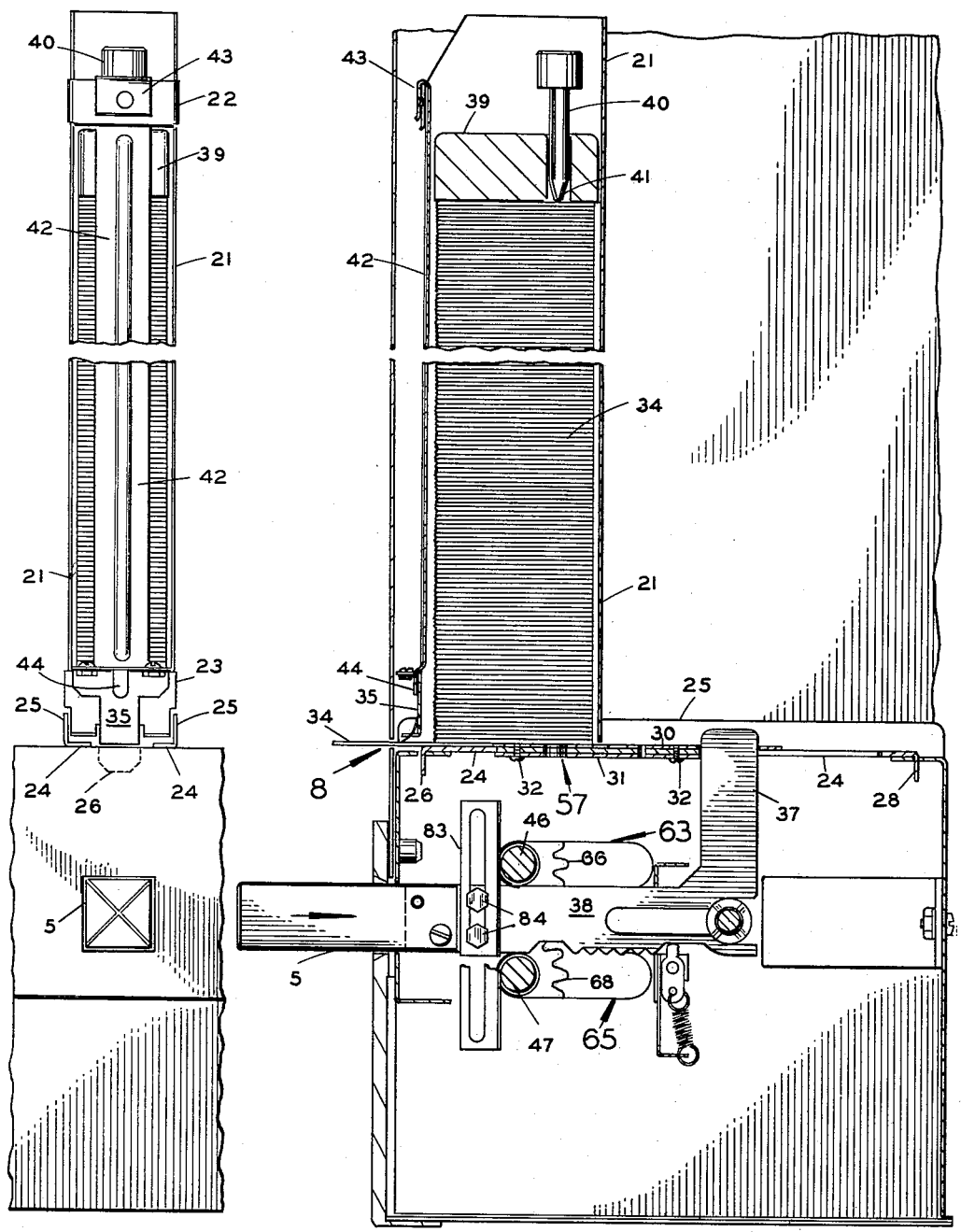

July 17, 1962

J. J. HILL 3,044,598

SELECTIVE VENDING MACHINE

Filed April 15, 1959

INVENTOR.
JAMES J. HILL
BY
Lloyd J Andres

July 17, 1962  J. J. HILL  3,044,598
SELECTIVE VENDING MACHINE
Filed April 15, 1959  9 Sheets-Sheet 5

INVENTOR.
JAMES J. HILL
BY
Lloyd Hundrex

July 17, 1962

J. J. HILL 3,044,598

SELECTIVE VENDING MACHINE

Filed April 15, 1959

INVENTOR.
JAMES J. HILL
BY
*Lloyd J. Andres*

July 17, 1962  J. J. HILL  3,044,598
SELECTIVE VENDING MACHINE
Filed April 15, 1959  9 Sheets-Sheet 8

INVENTOR.
JAMES J. HILL
BY
Lloyd J. Andrews

July 17, 1962   J. J. HILL   3,044,598
SELECTIVE VENDING MACHINE
Filed April 15, 1959   9 Sheets-Sheet 9

INVENTOR.
JAMES J. HILL
BY
Lloyd J. Andrus

United States Patent Office 3,044,598
Patented July 17, 1962

3,044,598
SELECTIVE VENDING MACHINE
James J. Hill, Miami, Fla., assignor to American Sumatra Tobacco Corporation, New York, N.Y., a corporation of Delaware
Filed Apr. 15, 1959, Ser. No. 806,710
6 Claims. (Cl. 194—17)

This invention in general relates to vending machines and more particularly to a selective machine for dispensing articles of different value upon the deposit of coins of different denominations, such as uniform packages or folders containing postage stamps or like articles of uniform size and shape.

The present invention comprehends features and improvements not found in prior machines which include a plurality of push buttons for selecting each of a variety of different priced articles and a single coin entry adapted to receive multiples of coins of different denominations corresponding to the articles.

These and the following constructional features are included among the principal objects of the invention.

Another object of the invention is the provision of an automatic means for locking against operation any selector button corresponding with a sold out article.

Another object of the invention is a provision of a coin receiving mechanism whereby coins deposited therein may be returned at the option of the user when one or more columns are sold out or improper coins deposited.

Another object of the invention is the provision of a mechanism responsive to movement of one or more of the selector push buttons for preventing fraudulent operation of the machine.

Another object of the invention is the provision of a means responsive to each of the selector push buttons for adjusting the operation thereof to correspond with the price of the articles in a corresponding column.

Another object of the invention is the provision of gear controlled means for selectively operating a pair of bars responsive to each of the selecting push buttons.

Another object of the invention is the provision of a coin mechanism in which certain elements may be substituted and interchanged for evaluating coins of different denominations in accordance with their diameters.

Another object of the invention is the provision of a plurality of quick detachable article magazine means adapted to remote loading for substitution in the machine.

These and other objects and advantages in one embodiment of the machine redescribed and shown in the appended specification and drawings in which:

FIG. 2 is a front elevation of the machine, shown FIG. 1, with the front portion of the casing removed.

FIG. 3 is an enlarged cross sectional elevation taken through section line 3—3, FIG. 2.

FIG. 4 is an enlarged front elevation of one of the columns shown FIGS. 2 and 3.

Figure 1:
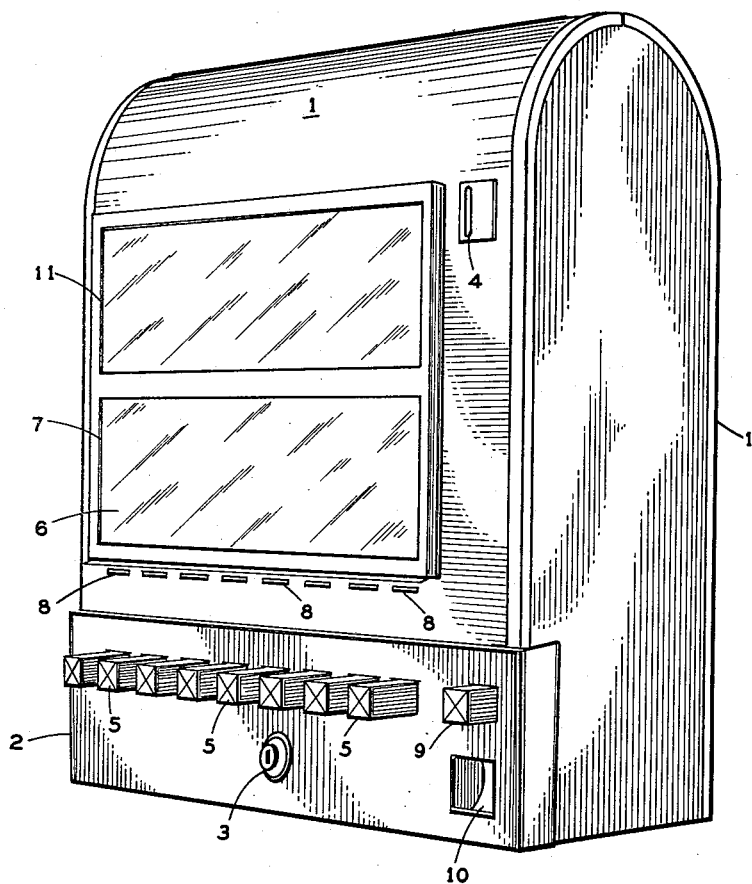
FIG. 1 is a perspective view of the vending machine in reduced scale.

Referring to FIG. 1, the entire machine is enclosed by removable casing 1 which casing is retained by a front plate 2. A lock means 3 normally secures the front plate to the casing and the internal frame of the machine.

A coin entry plate 4 is adapted to receive coins of various sizes and is connected with a coin chute in the machine. A row of selector push buttons 5 project from plate 2 and correspond to indices 6 and nomenclature positioned behind window 7. Delivery apertures 8 are also registered with and positioned below the indices 6. Coin return push button 9 is positioned for operation above return cup 10 positioned to receive coins deposited in the machine and returned by the operation of button 9, in the event one or all of the articles are sold out or following the deposit of improper coins. A panel 11 is provided for displaying written nomenclature.

Referring to FIG. 2, all elements of the machine are mounted on a main chassis or frame 12. In this embodiment eight vertical magazines 13 for retaining the articles stacked in a column are demountably secured in a row in vertical position on the upper horizontal portion of the chassis as shown.

A channel 14 is secured to frame 12 for holding a conventional combination coin sorter and slug rejector 15 retained therein by a thumbscrew 16. A coin guide chute 17 secured to the coin receiver 15 is positioned to conduct coins deposited in the entry 4, shown FIG. 1. A rod 18 responsive to movement button 9 is adapted for movement to scavenge the coin receiver 15 of coins retained therein when required. A coin box 19 is slidably positioned on the bottom of the chassis 12 and retained by captive pins 20—20 for retaining accepted coins discharged therein.

Referring to FIGS. 3 and 4, each magazine 13 consists of a U-shaped channel 21 having an upper bridge 22 secured across the open side of the upper portion thereof. A lower bridge member 23 is secured across the open lower side of channel 21, as shown in FIG. 4. Each channel has a bottom plate 24 having a pair of parallel upturned flanges preferably secured to the vertical channel 21 by spot welding. The front and rear ends of base plate 24 has downturned lugs 26 and 28 for register and engagement with slot 27 and 29 in the front and rear of frame 12 respectively.

Figure 5:
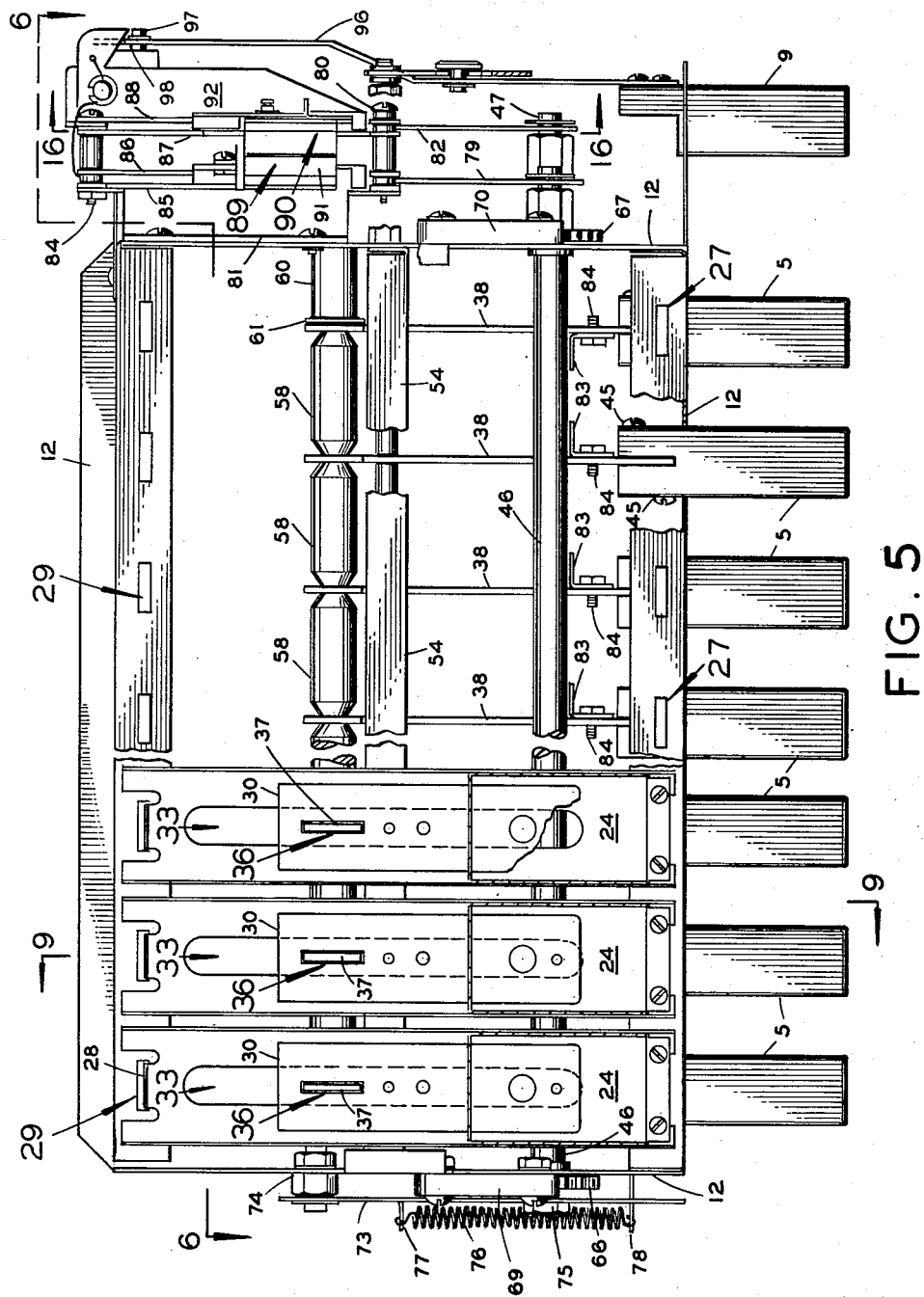
FIG. 5 is an enlarged fragmentary plan view taken through section line 5—5, FIG. 2.

Referring to FIGS. 3 and 5, a slide 30 having a thickness dimension corresponding with the thickness of one article is retained for reciprocating movement on the plate 24 by an auxiliary plate 31 under bottom plate 24 and secured to slide 30 by screws 32—32. Clearance for the movement of the screws 32—32 is provided by the elongated slot 33 in the bottom plate 24, as shown FIG. 5. The slide 30 is adapted to traverse the space within the lower end of channel 21 under the rear wall thereof for engaging and discharging through an aperture 8 the lowermost one of a column of packages retained in the channel, as illustrated in FIG. 3. The lowermost package 34 is shown in its ejected position positioned for manual removal. A flat spring pawl 35 is secured to bridge 23 and stressed inwardly whereby the lower edge thereof will be forced outward by the ejected article as a pawl for preventing re-insertion of the latter, as shown FIG. 3. The slide 30 is provided with an aperture 36 for receiving the upstanding end 37 of an operating bar 38 to be hereinafter described. Weights 39 are positioned for slidable vertical movement in each channel 21 and positioned on the uppermost of the packages 34 therein for compacting and urging the latter in a downward direction. A vertical bore in each weight 39 contains a loosely fitted shoulder pin 40 having a conical point 41 at the lower end thereof, the action of which will be hereinafter described. The columns are retained on the frame 12 by the close proximity of the inside of the casing 1.

It is now apparent that each column may be manually removed by first removing the casing 1 and then lifting each column in an upward direction disengaging lugs 26 and 28 from their respective slots 27 and 29 and the upstanding end 37 of bar 38. The packages 34 are laterally retained in each channel 21 by a retainer plate 42 having a hook shaped upper end 43 provided with a dimpled detent in engagement with bridge 22 and a lower tongue 44 extending through a suitable slot in bridge 23, as shown in FIGS. 3 and 4. Thus in reloading each channel with articles the retained plate 42 is disengaged by the upward movement thereof and permitting the removal of the weight 39 and pin 40. When the channel is reloaded with a column of articles the weight is placed on the uppermost article and the retainer plate replaced, as shown in FIG. 4. In this embodiment the article 34 represents a paperboard folder for retaining postage stamps therebetween. However, packages of greater thickness or of different dimensions are applicable for discharge from the same type of structure by providing a frontal upturned end to the slide 30 and relocating the pawn 35 and dimensioning the channels accordingly.

Figure 9:
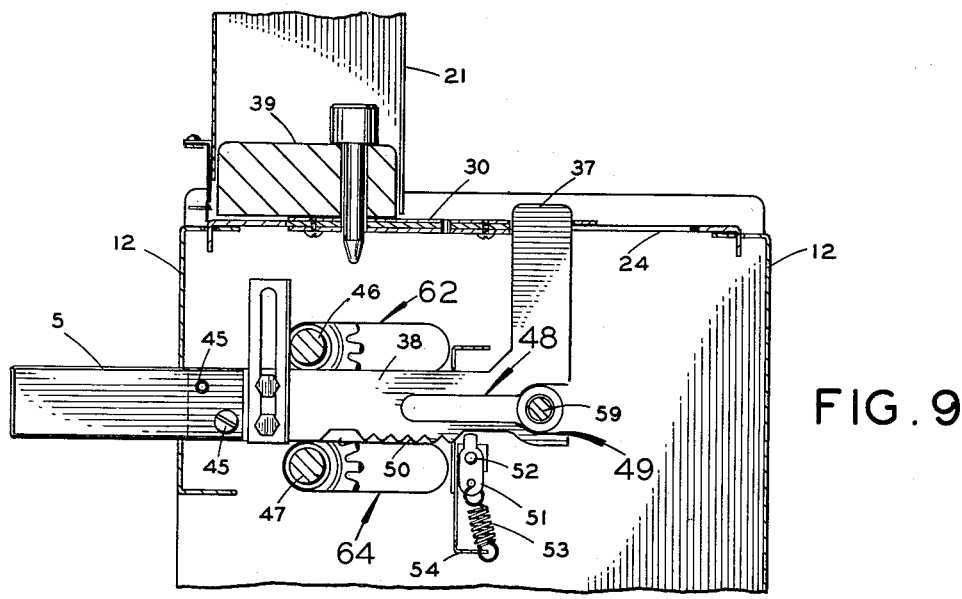
FIG. 9 is a fragmentary side elevation taken generally through section line 9—9, FIG. 5.

Referring to FIG. 9, operating bars 38 are positioned for reciprocation under each channel 21 and are supported by and secured to pushbuttons 5 by screws 45—45, better shown FIG. 5 with each pushbutton adapted to reciprocate in rectangular aperture in frame 12. Each bar 38 is further supported between the parallel shafts 46 and 47. The inner portion of each bar 38 contains a slot 48 opening into an enlarged opening 49 forming a fork for engagement with the blocking means to be hereinafter described. A plurality of teeth 50 in the lower edge of each bar 38 are adapted to engage a toggle lever 51 pivotally secured on a transverse rod 52 normally held in a neutral position by a spring 53 secured to transverse bracket 54 secured in the frame 12, better shown in FIGS. 5 and 6. It is to be noted in FIG. 6 that each pawl 51 is retained in alignment with each bar 38 by bushings 55 and off-set ears 56 in the bracket 54. The operation of the teeth 50 and the toggle 51 prevents improper partial reciprocation of the bar 38 by the button 5.

Figure 10:
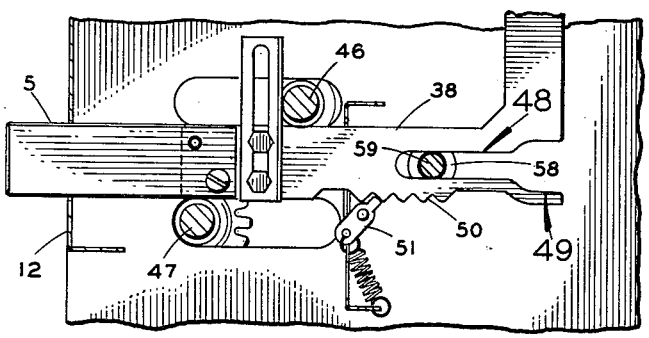
FIGS. 10 and 11 are fragmentary elevations of a portion of the mechanism shown FIG. 9 with elements in changed positions.

Referring to FIG. 3, it is now apparent that when the pushbutton 5 is fully depressed, the slide 30 will be withdrawn from channel 21 permitting the lowermost package 34 to descend and rest on bottom plate 24 by virtue of gravitation of weight 39 and the engagement of the upstanding end 37 of bar 38 with slide 30. It is also apparent that during the return of the bar 38 and the slide 30 to their normal rest positions a lowermost article 34 will be ejected by the latter. In the event the push bar is partially depressed, as shown in FIG. 10, toggle lever 51 will prevent its return and the delivery of the package until fully depressed at which position the pawl will be beyond the range of teeth 50, and will assume a neutral vertical position, as shown in FIG. 9, permitting the pawl to ride over the teeth during the return travel of bar 38.

Referring to FIG. 3, each slide 30 and plate 31 have coaxial holes therein which will coaxially register with a hole in plate 24 forming a passage 57 when in rest position which is in vertical alignment with the pin 40 in the weight 39 which pin will remain resting upon the uppermost package in the channel, as shown in FIG. 3, until this last package is ejected at which time the pin will gravitate through the passage 57 and thus lock slide 30 with base plate 24 for preventing further operation of a corresponding pushbutton 5.

Figure 6:
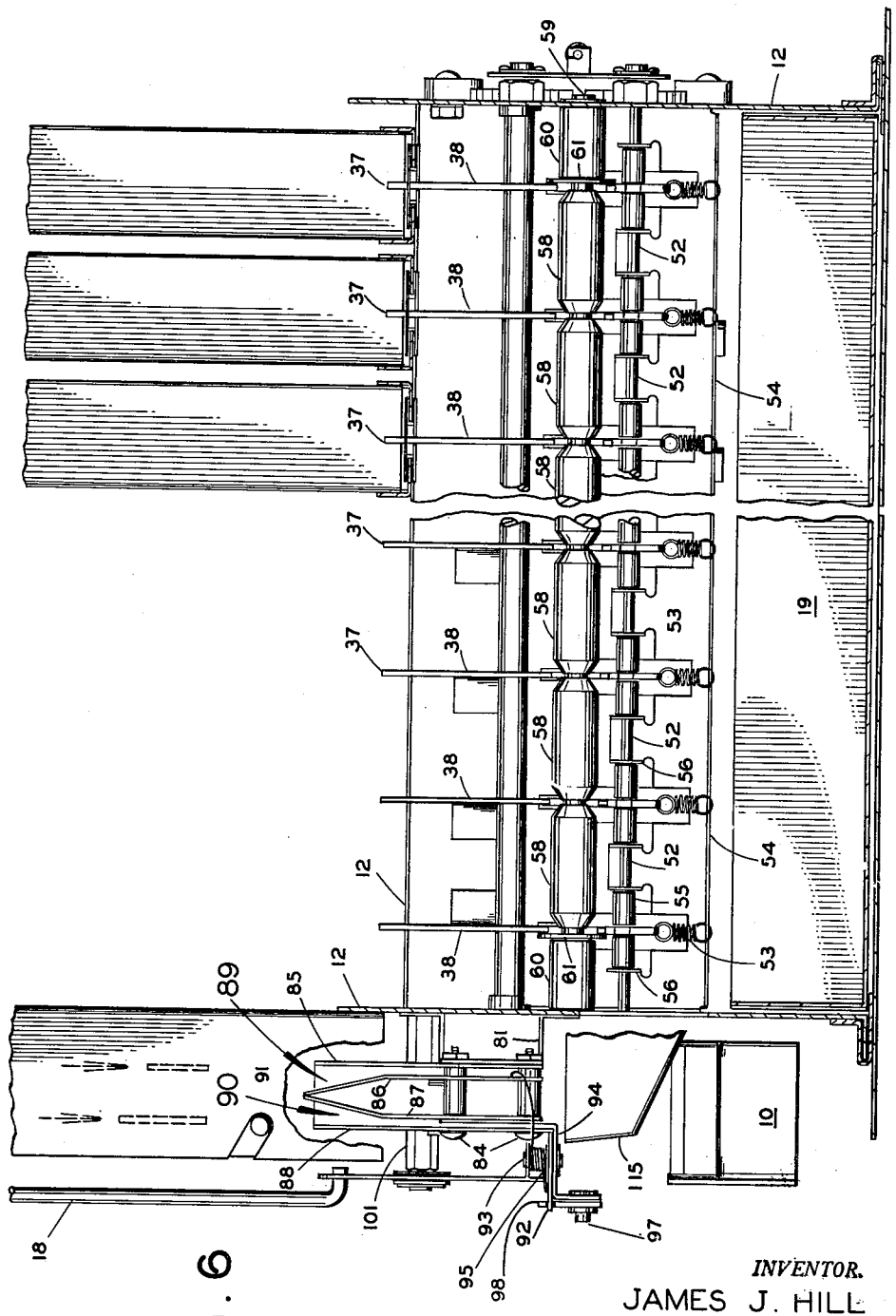
FIG. 6 is an enlarged cross sectional rear elevation taken through section lines 6—6, FIG. 5.

Referring to FIG. 6, bushings 58 having a conical shape at each end thereof and are slidably retained for axial movement between each of the bars 38 on a transverse shaft 59 secured in the opposite ends of frame 12, as shown. Cylindrical bushings 60—60 including washers 61—61 are fitted on shaft 59 between each of the outer bars 38 at opposite ends of frame 12, as shown. The overall length of each bushing 58 is such, as to establish a predetermined total end clearance between any pair of bushings and between the washer 61 and the adjacent bushing 58 and to permit a single bar 38 to pass therethrough for full inner movement. Thus all of the bushings on either side of the bar depressed will be laterally displaced a sufficient distance for end to end abutment and to interfere with and stop the inward movement of any other bars 38.

The enlarged opening 49 provides space for free lateral movement of the bushings 58 through the end of any bar 38 when in outward rest position and also serves to guide each bar in a linear path when opposite edges of the opening 49 are cammed against the conical end of the bushings when the latter are moved for normal free travel or when blocking any bar against inward travel.

Referring to FIGS. 3, 5, 7 and 8, the upper and lower selector shafts 46 and 47 are supported at opposite ends of the frame 12 in independent horizontal slots 62—63 and 64—65 therein respectively for movement in a direction lateral to the axes thereof. The upper and lower shafts 46 and 47 have secured to their opposite ends thereof gears 66—67 and like gears 68—69 respectively.

Figure 7:
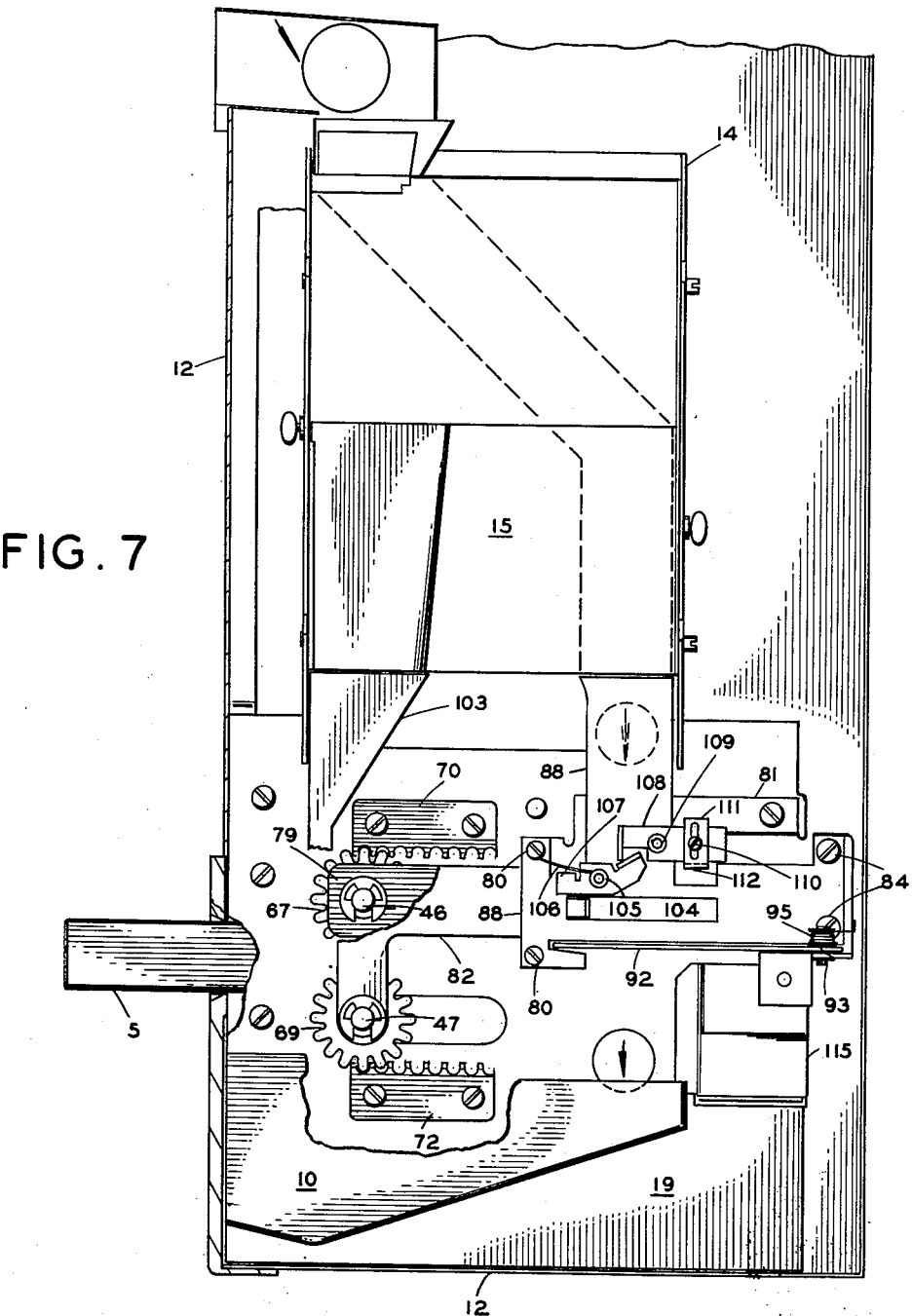
FIG. 7 is an enlarged right side elevation with a portion of the casing removed.
Figure 8:
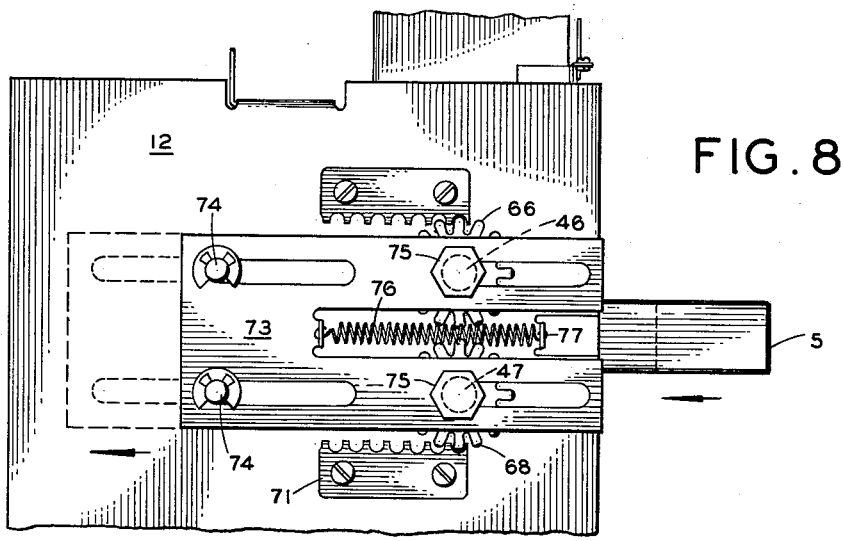
FIG. 8 is a fragmentary left side elevation of the machine shown FIG. 5.

The upper gears 66 and 67 are adapted to mesh with horizontal racks 69 and 70 respectively and the lower gears 68 and 69 are adapted to mesh with horizontal racks 71 and 72 as shown in FIGS. 7 and 8.

Referring to FIG. 8 a shaft biasing plate 73 is supported and guided for reciprocation by slots therein at one end by shoulder studs 74—74 secured in the left side of frame 12 as shown in FIGS. 5 and 8 and is supported at its front end by shoulder screws 75—75 through slots in the plate and threaded into the left ends of the shafts 46 and 47 as shown.

A spring 76 is secured under tension by its opposite ends to a lug 77 in plate 73 and a lug 78 in frame 12 normally urges the plate and the shafts 46 and 47 in their forward positions.

A first coin bar 79 is secured to the end of shaft 46 by a C washer means and supported for reciprocation on bushings between screws 80—80 threaded into a bracket secured to the right hand end of the frame 12 as shown in FIGS. 6 and 7. A second coin bar 82 is secured to an extended end of shaft 47 by a C washer and is also adapted to reciprocate between screws 80—80. Thus the energized spring 76 normally urges the plate 73, the shafts 46—47, and the coin bars 79 and 82 into their normal rest positions as shown FIGS. 7 and 8.

Referring to FIG. 3 adjustable selector members 83 are slidably secured for adjustment to each of three vertical positions on each operating bar 38 by screws 84—84 also shown FIG. 5. Referring to FIG. 3, when any pushbutton 5 and selecting bar 38 are moved in the direction shown by arrow and the member 83 is secured in its upper position, the upper shaft 46 will be rotated forward by virtue of the engagement of gears 66 and 67 on their respective racks. When any one of the selector members 83 is adjusted to its lowermost position on a bar 38 the shaft 47 will be rotated inwardly by rotation of gears 68 and 69 rotated on their respective racks. When a selector member 83 is positioned in its midposition with respect to a bar 38 the forward movement thereof will simultaneously move both shafts 46 and 47 in a forward direction. Thus each pushbutton is capable of performing each of three different operations which correspond with three different priced articles and three different combinations of coins.

It is to be noted that the tendency for axial misalignment of the bars 46 and 47 when moved is prevented by the positive engagement of the gears and their corresponding racks at opposite ends thereof regardless of which pushbutton is operated. It is also to be noted that the plate 73 under the influence of spring 76 will return either or both of the shafts 46—47 in proper alignment as well as any one of the bars 38 and corresponding buttons 5 following the operation thereof.

Referring to FIGS. 5, 6 and 7 a coin accumulator for receiving coins of two denominations having a different diameter and selectively permitting the operation of selector buttons 5 corresponding to articles of three different values is secured to bracket 81 on the right hand side of the frame 12, as shown in FIGS. 5, 6 and 7. Coin guide plates 85—86 and 87—88 are retained in spaced relation by screws 84 by appropriate bushings shown FIG. 5. The space between plates 85 and 86 forms the receiving passage 89 for coins of small diameter and the space between plates 87—88 form a passageway 90 for coins of large diameter. A divider 91 is formed by a continuation of plates 86 and 87 to provide a guide for the pre-separated coins. A coin return blade 92 is pivotally mounted on a stud 93 on a bracket 94 retained by screws 84—84. The blade is normally biased by a torsion spring 95 to a rest position under the passageways 89 and 90 for the purpose of supporting the coins gravitated therein. The coin return cup 10 shown FIG. 1 has a rear opening extending under the forward end of blade 92 for receiving coins discharged from the passageways 89 and 90 when the blade 92 is rotated to a position away from the passageways illustrated in FIG. 7.

Figure 18:
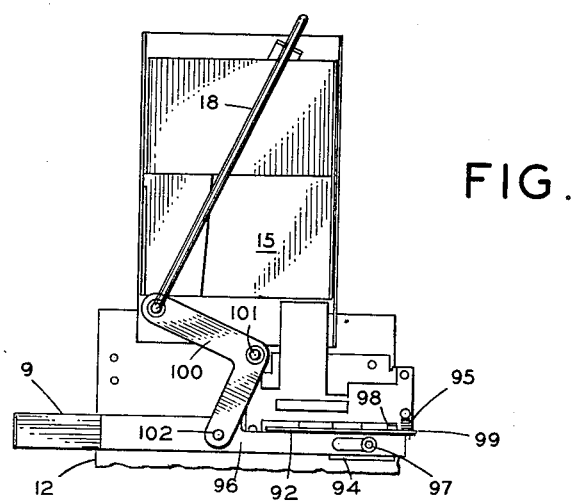
FIG. 18 is a fragmentary elevation of the right side of the machine with casing removed.

Referring to FIG. 18 the coin return button 9 is supported for reciprocation by a stud 97 in bracket 94. A projection 98 extending upward from the inner end of release bar 96 is adapted to cam against an offset portion 99 of blade 92 against the restraining action of spring 95 for rotating the latter from its rest position for supporting coins to an outward position permitting the coins resting thereon to gravitate into coin return cup 10.

A bellcrank 100 pivotally secured to a stud 101 in frame 12 with the outer ends thereof pivotally connected to bar 96 by stud 102 and to rod 18 respectively provides a means for the simultaneous release of coins in the coin channels and for operating a well known scavenger mechanism in the rejector 15 for rejecting coins or debris suspended therein into chute 103 for descent into return cup 10, best shown in FIG. 7. The bar 96 is returned to its normal position by spring 93 and other spring means in rejector 15 not shown.

Referring to FIG. 7 the outside plate 88 has pivoted thereon a lock lever 104 journalled on a stud 105 normally urged into position shown by spring 106. An offset abutment 107 on lever 104 extends into the path of movement of slide 82.

A release lever 108 also pivoted on a stud 109 in plate 88 has an end adapted to engage and move lever 104 as shown. The opposite end of lever 108 has secured thereon by screw 110 an adjustable coin sizing bracket 111 having a lug 112 thereon extending into the coin passage 90 between plates 87 and 88.

Figure 16:
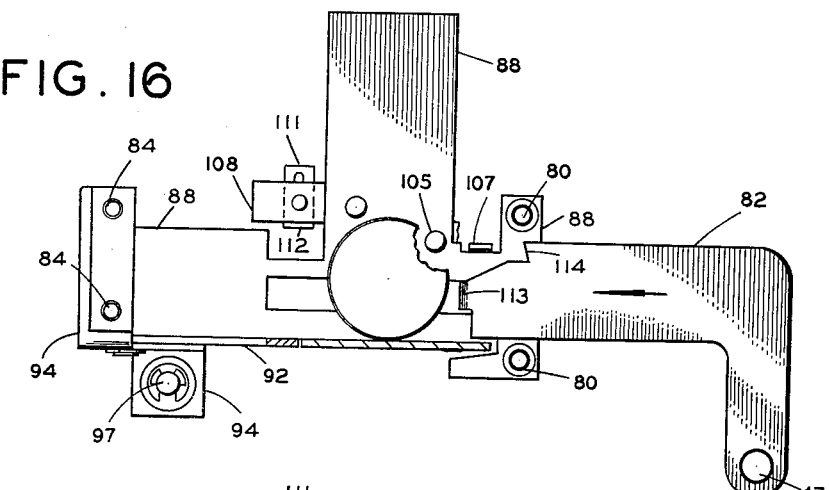
FIG. 16 is a left side elevation taken through section line 16—16, FIG. 5.

Referring to FIG. 16 the inner end of slide 82 has an outward extending lug 113 positioned for slidable movement in a slot in plate 88 and also has an oblique abutment 114 movable in a path occupied by abutment 107 for normally blocking and preventing the dispensing movement of the slide.

Figure 17:
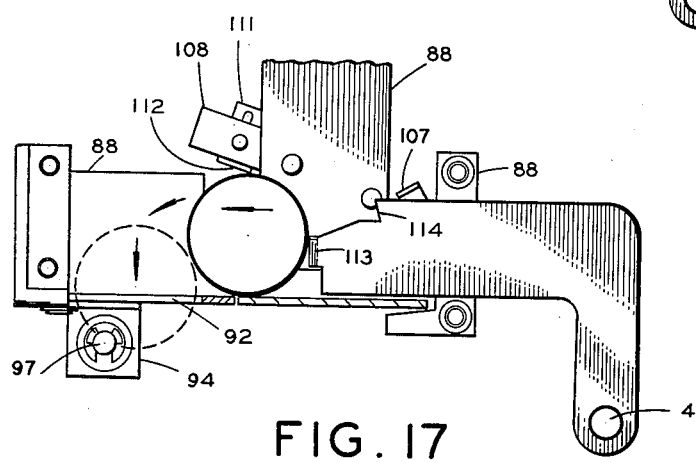
FIG. 17 is the same as FIG. 16 with elements in changed position.

When the coin sizing bracket 111 is adjusted for a coin of predetermined diameter and said coin is deposited in the passageway as shown and when the slide 82 is moved in a direction shown by arrow, the lug 113 will engage the forward end of the coin and move same against lug 112. Continued movement of the slide will rotate lever 108 which in turn will rotate lever 104 and raise abutment 107 from the path of travel of abutment 114 thus permitting a full dispensing stroke of slide 82 and the gravity discharge of a coin in a path illustrated by arrows in FIG. 17 for descent through a chute 115 secured to frame 12 shown in FIG. 7 and gravitation into money box 19.

The same elements above described for the coin release of slide 82 are positioned on plate 86, not shown, and responsive to a coin of different diameter for releasing the slide 79. Thus it is apparent that the deposit of one of each of coins of predetermined different diameters will release both slides for dispensing an article of highest value, and single deposits of each coin will release each corresponding slide to dispense articles of two other values.

Figure 11:
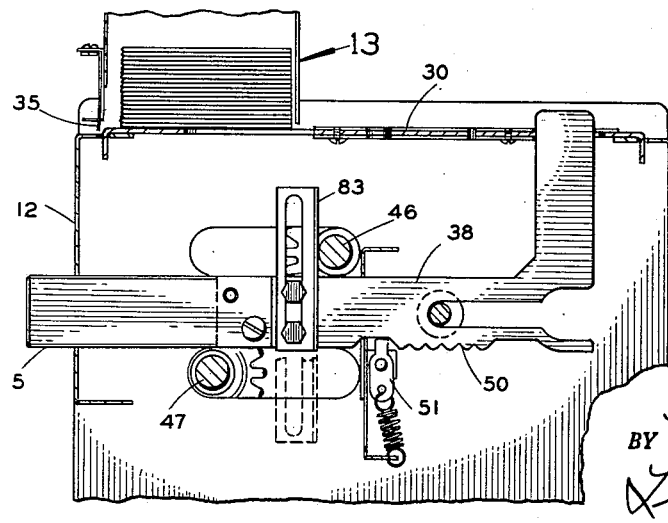

In operation and referring to FIG. 11, each pushbutton 5 corresponding to each magazine 13 is adapted to move to fully depressed position as shown, with the end of the dispensing slide 30 withdrawn for return movement by virtue of a spring for the ejection from under pawl 39 the lowermost article from the magazine. The toggle lever 51 riding over teeth 50 preventing partial reciprocation of bar 38.

The selector bar 83 is positioned in its upper adjustment position with respect to bar 38 for engagement with selector shaft 46 only which corresponds with a coin of small diameter adapted to be deposited in the passage 89 for unlocking the coin slide 79.

Figure 12:
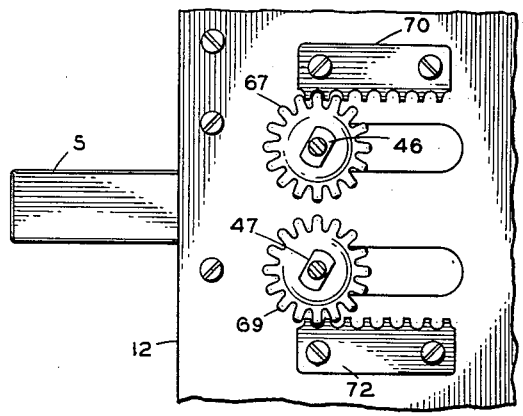
FIGS. 12, 13, 14 and 15 are fragmentary elevations of elements, shown FIG. 7, in changed positions.

FIG. 12 represents the position of one of the pushbuttons 5 and the shafts 46 and 47 when the machine is in rest position.

Figure 13:
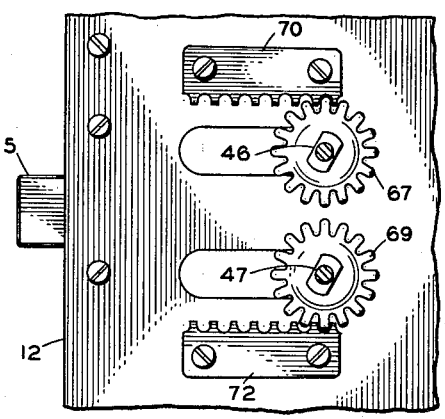

FIG. 13 illustrates the depression of a selected push button 5 following the deposit of coins of both small and large diameter with both shafts 46 and 47 rolled to their dispense position by selector member 83 adjusted to its mid position.

Figure 14:
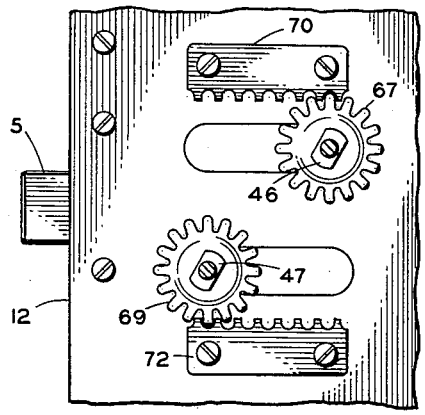

FIG. 14 illustrates the depression of a selected push button 5 following the deposit of a coin of small diameter only with shaft 46 rolled to its dispense position by selector member 83 adjusted to its upper position as shown FIG. 11.

Figure 15:
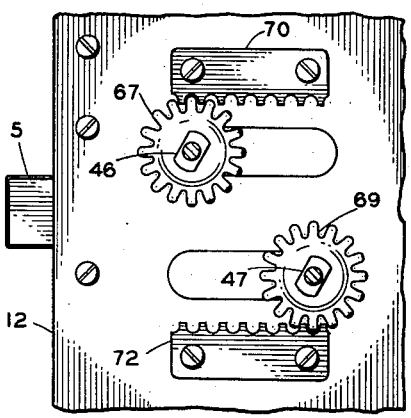

FIG. 15 illustrates the depression of the selected push button 5 following the deposit of a coin of large diameter with shaft 47 rolled to its dispense position by selector member 83 adjusted to its lowermost position.

It is to be noted that the gears on opposite ends of shafts 46 and 47 in engagement with their corresponding racks provide for proper free axial movement of the shafts 46 and 47 regardless of the linear distribution of the forces along the latter applied by each of the push bars 38.

Referring to FIG. 1 it is now apparent that each of the magazines corresponding with the push buttons 5 may be loaded with articles of either one, two or three predetermined values respectively and the selector bars 83 each corresponding to each said magazines adjusted to correspond to any one of each article of three values, and to receive and operate locking means to respond to the deposit therein of either or both two predetermined coins of different diameters to permit the operation of a corresponding push button to selectively dispense an article from any of the magazines.

It is understood that certain modifications in construction of the machine above described is intended to come within the scope of the appended claims.

Having described my invention, I claim:

1. A selective vending machine comprising a means forming a frame, a plurality of vertical magazines positioned in a row on said frame for retaining articles of three different values respectively, each said magazine adapted to retain a plurality of articles of like size in vertical stacked relation and of like predetermined value, a slide means positioned in the lower end of each said magazine positioned and adapted to engage and dispense the lowermost one of said articles from said magazine when reciprocated, a push bar means including a push button on the front end thereof corresponding to each of said magazines journalled for reciprocation in said frame and positioned under and engaged with each said slide means for reciprocating the latter when manually operated, a plurality of blocking bodies movably retained on a fixed member in said frame and positioned for limited linear displacement in a path normal to the path of movement of all of said bar means, said blocking bodies constructed and adapted for a predetermined linear clearance therebetween for permitting only one of said bar means at a time to laterally displace said bodies and move between a pair thereof when a selected one of said bar means is operated, first and second selecting shafts in parallel spaced relation retained in said frame for independent reciprocation lateral to the axes thereof from a rest position to a dispense position, a pair of gears coaxially secured to each opposite end of each said shaft including an independent rack gear meshed with each of said gears fixed to said frame positioned and adapted to independently rotate each of said shafts from both ends thereof when independently moved from said rest to said dispense position, a selector member secured on each said push bar means for pre-adjustment to each of three positions and adapted to selectively abut each or both of said shafts and move same from said rest to said dispense position when adjusted and said bar means are operated, spring means biasing said shafts and said frame for independently urging each of said shafts into said rest position, a locking means on said frame and independently connected to each of said first and second shafts normally preventing the movement of each of said shafts from said rest to said dispense positions, a first portion of said locking means adapted and responsive to the deposit therein of a predetermined coin of small diameter to release said first shaft for reciprocation and to discharge said coin therefrom when said shaft is moved to its said dispense position, a second portion of said locking means adapted and responsive to the deposit therein of a coin of larger diameter to release said second shaft for reciprocation and to discharge therefrom said coin when said shaft is moved to its said dispense position whereby the selective deposit of either a coin of said small diameter or said large diameter or both in said locking means will permit the selective operation of said push buttons for dispensing from said corresponding magazines an article of each of three different predetermined values.

2. In a selective vending machine of the character described, means forming a frame, a pair of parallel selector shafts supported by the end portions thereof in said frame for independent reciprocating movement normal to the axes thereof along corresponding spaced parallel paths from an idle to a vend position, a gear means secured at opposite ends of each of said shafts meshed with independent rack gears secured to said frame for independently rotating each said shaft when reciprocated, urging means biased between said frame and each of said shafts for urging the latter into said idle position, a coin release means on said frame selectively responsive to the deposit of each or both of two coins of different denomination, a normally locked pair of slide members in said release means corresponding to each of said two coins constructed and adapted to be independently unlocked for reciprocation by the deposit of each of said corresponding said coins in said release means, each of said members journalled to one end of each of said shafts for independent reciprocation therewith when the latter are operated, a plurality of push bars journalled in said frame for reciprocation normal to and in a longitudinal path parallel the path of reciprocation of said shafts from a rest to a vend position when operated, an abutment on at least one of said push bars positioned to engage one of said shafts and move same to said vend position when a corresponding said coin is deposited in said release means and said bar operated, a second abutment on at least one other of said push bars positioned to engage the other of said shafts and move same to said vend position when a corresponding other said coin is deposited in said release means and said bar is operated whereby each of said shafts may be selectively operated to make each of two selections in said vending machine.

3. The construction recited in claim 2 including a dual abutment on one of said push bars positioned to engage and move both of said shafts from said normal to said vend position when both said coins are deposited in said release means and said bar operated for providing a third selection in said vending machine.

4. The construction recited in claim 2 including an adjustable abutment means on at least one of said push bars, locking means for selectively retaining said adjustable abutment on said one of said bars in a first position to engage and operate one of said shafts and a second position to engage and operate the other of said shafts and a third position to operate both said shafts for obtaining three forms of selectivity from said bars corresponding to either or both coins deposited in said release means.

5. In a vending machine of the character described, a means forming a frame, a pair of parallel selector shafts supported by the end portions thereof in said frame for independent movement normal to the axes thereof along corresponding spaced parallel planes from an idle to a vend position, independent coin release means secured to the ends of said shafts at one side of said frame, each of said release means responsive to the deposit of one of each coin of predetermined different denominations for permitting corresponding and independent reciprocation of each said shaft, a bias plate secured for reciprocation on the opposite said side of said frame for movement parallel to the path of reciprocation of said shafts from an idle to a displaced position, said plate having a pair of slots therein engaged with ends of said shafts opposite the aforesaid ends, spring means biased between said frame and said plate for normally urging said plate and said shafts into said normal position for independently returning each of said shafts when moved to said vend position.

6. In a vending machine of the character described, a means forming a frame, a pair of parallel shafts supported one above the other in said frame by the end portions thereof for independent reciprocating movement normal to the axis thereof along parallel paths from an idle to a vend position, gear means on said frame and on each of said shafts in normal engagement for the independent rotation of the latter when reciprocated for the positive displacement of each of said shafts, urging means biased between said frame and said shafts for independently urging each of the latter into said idle position, a plurality of push bars adapted for manual operation and journalled in said frame positioned for longitudinal reciprocation between said shafts and parallel the paths of movement thereof, a selector member adjustably secured to each of said bars positioned for reciprocating movement normal thereto, each said member adapted for retention in three positions for engaging each or both of said shafts and moving same from said idle to said vend position when each of said bars is manually operated, for vending articles from said machine of three different values corresponding to the said adjustment of each said member on each of said bars.

References Cited in the file of this patent

UNITED STATES PATENTS

| | | |
|---|---|---|
| 1,688,114 | Buchner | Oct. 16, 1928 |
| 1,749,579 | Giles | Mar. 4, 1930 |
| 2,858,001 | Neidig | Oct. 28, 1958 |
| 2,948,378 | Goldbert et al. | Aug. 9, 1960 |

FOREIGN PATENTS

| | | |
|---|---|---|
| 366,087 | Great Britain | Jan. 27, 1932 |